(12) United States Patent
Ogura

(10) Patent No.: US 8,096,120 B2
(45) Date of Patent: Jan. 17, 2012

(54) MOVABLE MECHANISM

(75) Inventor: Kenichi Ogura, Tokyo (JP)

(73) Assignee: Furukawa-Sky Aluminum Corp., Tokyo (JP)

( * ) Notice: Subject to any disclaimer, the term of this patent is extended or adjusted under 35 U.S.C. 154(b) by 601 days.

(21) Appl. No.: 11/798,151

(22) Filed: May 10, 2007

(65) Prior Publication Data

US 2007/0267108 A1 Nov. 22, 2007

Related U.S. Application Data

(63) Continuation of application No. PCT/JP2004/017213, filed on Nov. 12, 2004.

(51) Int. Cl.
F01B 29/10 (2006.01)
(52) U.S. Cl. .......................... 60/528; 60/529
(58) Field of Classification Search ............. 60/527–529
See application file for complete search history.

(56) References Cited

U.S. PATENT DOCUMENTS

| | | | | |
|---|---|---|---|---|
| 4,811,564 | A * | 3/1989 | Palmer | 60/527 |
| 6,367,251 | B1 * | 4/2002 | Wood | 60/528 |
| 7,076,951 | B2 * | 7/2006 | Zanella et al. | 60/527 |
| 7,451,596 | B2 * | 11/2008 | Culpepper et al. | 60/527 |

FOREIGN PATENT DOCUMENTS

| | | |
|---|---|---|
| JP | 59-184129 U | 12/1984 |
| JP | 63-276749 A | 11/1988 |
| JP | 64-7026 A | 1/1989 |
| JP | 1-128209 U | 9/1989 |
| JP | 2-18537 A | 1/1990 |
| JP | 2-181742 A | 7/1990 |
| JP | 7-264274 A | 10/1995 |
| JP | 8-211468 A | 8/1996 |
| JP | 8-292470 A | 11/1996 |
| JP | 9-211572 A | 8/1997 |
| JP | 9-303379 A | 11/1997 |
| JP | 10-301168 A | 11/1998 |
| JP | 2001-141973 A | 5/2001 |
| JP | 2001-164348 A | 6/2001 |
| JP | 2002-304241 A | 10/2002 |
| JP | 2003-29323 A | 1/2003 |
| JP | 2004-200397 A | 7/2004 |
| JP | 2004-341088 A | 12/2004 |

OTHER PUBLICATIONS

Shape Memory Effect and Super-elasticity of Alloy, Jan. 1, 2002, pp. 12-19.
Office Action dated Jul. 21, 2009 for Japanese Application No. 2003-135417.
Office Action dated Oct. 5, 2010 for Japanese Application No. 2003-135417.
Office Action dated Oct. 6, 2009 for Japanese Application No. 2003-135417.
Office Action dated Oct. 15, 2010 for Korean Application No. 10-2007-7013109.

* cited by examiner

*Primary Examiner* — Hoang Nguyen
(74) *Attorney, Agent, or Firm* — Birch, Stewart, Kolasch & Birch, LLP

(57) ABSTRACT

A movable mechanism having: a fixed body (1); a movable body (4); and a driving member (2), one end of which is attached to the fixed body and the other end of which is attached to the movable body, for changing the position of the movable body, wherein the driving member (2) is composed of a shape restorable material, and the movable body (4) is moved by shape restorability of the driving member (2) that has been released movable body (4) from being fixed.

27 Claims, 5 Drawing Sheets

(a)    (b)

(A)

(B)

(a)　　　(b)　　　(c)

(C)

(a)　　　(b)　　　(c)

(A)

(B)

(a)     (b)

(A)

(a)  (b)

(A)

(a)　　　　(b)　　　　(c)

MOVABLE MECHANISM

This application is a Continuation of copending PCT International Application No. PCT/JP2004/017213 filed on Nov. 12, 2004, which designated the United States, and on which priority is claimed under 35 U.S.C. §120. The entire contents of the above document is hereby incorporated by reference.

TECHNICAL FIELD

The present invention relates to a movable mechanism that can be used in an apparatus for use as a pop-up, such as a stroboscope of a camera, a video-tape insert section of a video camera, and a portable phone.

BACKGROUND ART

Hitherto, various movable mechanisms are provided for pop-up of a part, including, for example, those by motor drive (e.g. JP-A-9-211572 ("JP-A" means unexamined published Japanese patent application)), those by coil spring drive (e.g. JP-A-2002-304241), and those by wire spring drive (e.g. JP-A-63-276749).

In the above patent document 1, the motor is used as a driving source, and a flush apparatus is popped up by means of an intermediate gear and a solid cam. In patent document 2, the coil spring is used as a driving source, and a large stroke is obtained by combining the spring with an auxiliary pin that also serves as a guide in the pop-up direction. In patent document 3, a repulsive force of the wire spring provided at the end of the apparatus is used as a driving source, and the part is popped up by combining the spring with a lock releasing member.

While the apparatus using the movable mechanism is being made lightweight in recent years, the movable mechanism itself is required to be lightweight and have a simple mechanism.

However, in patent document 1 using a motor as a driving source, since the stroboscope is popped up by taking advantage of the driving power of the motor by means of the gear and solid cam, the occupation area of the mechanism becomes inevitably large with a complex mechanism. Further, while the mechanism is attempted to be lightweight and simple in the movable mechanisms taking advantage of the coil spring or wire spring as the driving source as described in patent document 2 and patent document 3, a sufficient action force cannot be obtained, although a large stroke is readily obtained by using the coil spring as the driving force. On the contrary, while a sufficiently large action force can be obtained by using the wire spring, a large stroke may be hardly obtained. Therefore, a driving mechanism exhibiting large action force and stroke with a light and simple mechanism is desired.

Other and further features and advantages of the invention will appear more fully from the following description, taken in connection with the accompanying drawing.

DISCLOSURE OF INVENTION

Figure 1:
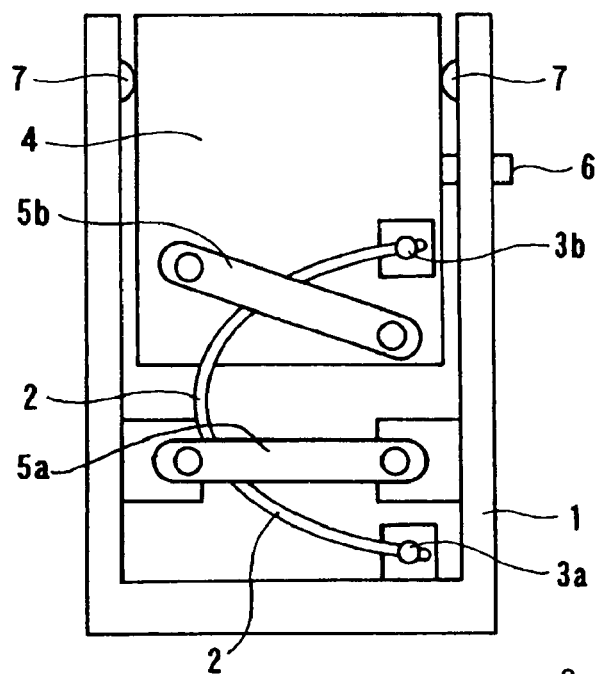
FIG. 1(A) is a front view showing the movable mechanism according to Example 1 in the present invention.
FIG. 1(B) is an explanatory view showing the action of the driving member used in the example.
FIG. 1(C) is an enlarged view showing the radii of curvature of neutral axes (a), (b) and (c) in FIG. 1(B).
Figure 1:
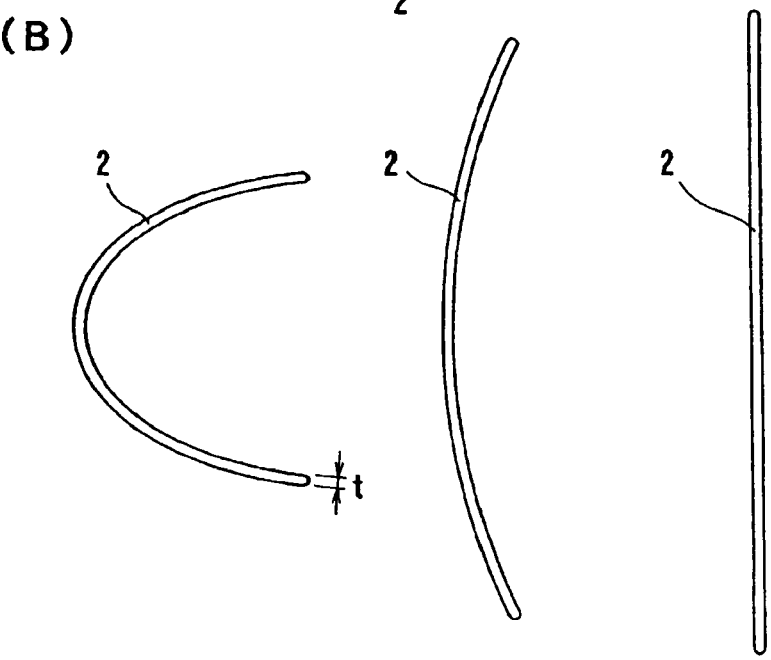
Figure 1:
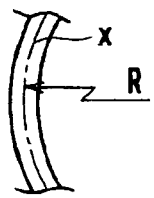
Figure 1:
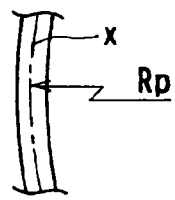
Figure 1:
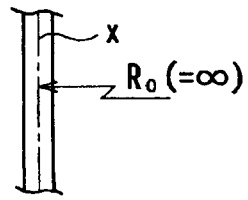

Preferable embodiments of the movable mechanism of the present invention are as follows.
(1) A movable mechanism comprising: a fixed body; a movable body; and a driving member, one end of which is attached to the fixed body and the other end of which is attached to the movable body, for changing the position of the movable body, wherein the movable body is moved by shape restorability of the driving member. The movable body may comprise a releasable fixture.
(2) The movable mechanism according to the above item (1), wherein the driving member is a super-elastic body, and the driving member has strain "e" as determined by $e = (t/2R) - (t/2R_0)$ is 4% or less, in which "$R_0$" is a radius of curvature of a neutral axis of the driving member at a load-free state, "R" is a radius of curvature of the neutral axis formed when both ends of the driving member are closest to one another, and "t" is the thickness or diameter of the driving member.
(3) The movable mechanism according to the above item (1) or (2), wherein the driving member is subjected to a shape memory treatment in advance for allowing the driving member to curve in the direction for bending the driving member, when the movable body moves relative to the fixed body.
(4) The movable mechanism according to the above item (1) or (2), wherein the driving member is subjected to a linear shape memory treatment, and comprises a mechanism for preventing the driving member from returning to linear shape even when the both ends of the driving member respectively fixed to the fixed body or the movable body are in the most separate position.
(5) The movable mechanism according to any one of the above items (1) to (4), wherein the movable member is composed of a Ni—Ti alloy which is a super-elastic body, and the composition of the alloy comprises 50.2 to 51.5 at % of Ni, with the balance being Ti and inevitable impurities.
(6) The movable mechanism according to any one of the above items (1) to (4), wherein the movable member is composed of a Ni—Ti alloy which is a super-elastic body, and the composition of the alloy comprises 49.8 to 51.5 at % of Ni, and 0.1 to 2.0 at % of at least one out of Cr, Fe, V, Al, Cu, Co and Mo, with the balance being Ti and inevitable impurities.
(7) The movable mechanism according to any one of the above items (1) to (4), wherein the movable member is composed of a Ni—Ti alloy which is a super-elastic body, and the composition of the alloy comprises 49.0 to 51.0 at % of Ni, 5 to 12 at % of Cu, and 0.1 to 2.0 at % of at least one out of Cr, Fe, V, Al, Co and Mo, with the balance being Ti and inevitable impurities.
(8) The movable mechanism according to any one of the above items (1) to (7), wherein at least two driving members are used in the movable mechanism.
(9) The movable mechanism according to any one of the above items (1) to (8), comprising a movable body guide member for guiding movement of the movable body to control the speed of the movable body when the movable body moves.

(10) The movable mechanism according to any one of the above items (1) to (9), comprising a driving member guide member for guiding deformation of the driving member to set a deformation limit position of the driving member, when the movable body moves.

BEST MODE FOR CARRYING OUT THE INVENTION

The present invention will be described in more detail below.

The movable mechanism of the present invention comprises a fixed body, a movable body, and a driving member, one end of which is attached to the fixed body and the other end of which is attached to the movable body, for changing the position of the movable body, wherein the driving member is composed of a shape restorable material, and the movable body can be moved by releasing the movable body from being fixed.

A shape restorable material is used for the driving member in the invention. Herein, the term "shape restorability" means a property for restoring the shape to the original shape upon removing an external force, such as elasticity. Using such structure permits a large action force and stroke (movable range) to be obtained by using a small driving member. Using a super-elastic material is desirable among all, because a larger action force and stroke may be obtained with a smaller driving member as compared with using usual coil springs and wire springs. Further, since the force applied on the movable body during movement is maintained to be approximately constant by using the super-elastic material, design of the mechanical strength of the movable body may be advantageously facilitated.

A Ni—Ti alloy is preferably used for the super-elastic material because the alloy is excellent in fatigue strength and corrosion resistance. A martensitic transformation temperatures and a reverse transformation temperature (both are collectively called as a transformation temperature, hereinafter, unless otherwise specified) that govern super-elastic characteristics, vary largely depending on the composition and heat treatment conditions of the alloy. The transformation temperature may be controlled in a wide temperature range of about −100 to 30° C. by using the alloy having the composition of 50.2 to 51.5 at % of Ni with the balance being Ti and inevitable impurities. It is known that in the composition range of Ni, the transformation temperature decreases about 10° C. for each 0.1% increase in the Ni composition ratio.

Further, when the alloy has the composition of 49.8 to 51.5 at % of Ni, and 0.1 to 2.0 at % of at least one out of Cr, Fe, V, Al, Cu, Co and Mo, with the balance being Ti and inevitable impurities, the transformation temperature can be controlled by selecting the kind and amount of these slightly-added elements such as Cr. Specifically, super-elasticity can be obtained at a lower temperature since the transformation temperature decreases by adding these slightly-added elements. Accordingly, the kind and amount of these slightly-added elements are selected depending on the environmental temperature for using the movable mechanism.

Furthermore, when the alloy has the composition of 49.0 to 51.0 at % of Ni, to 12 at % of Cu, and 0.1 to 2.0 at % of at least one out of Cr, Fe, V, Al, Cu, Co and Mo, with the balance being Ti and inevitable impurities, Cu contained in the alloy permits super-elastic characteristics such as recovery strain to be improved in addition to enabling the transformation temperature to be controlled by selecting the kind and amount of the slightly-added elements such as Cr. The composition ratio of Cu is determined as described above because good super-elasticity cannot be obtained when the content is less than 5%, while industrial processing is difficult when the content is more than 12%.

A generally known relation may be used as the relation between the kind and amount of slightly-added elements such as Cr and the transformation temperature. Further, the method and conditions of heat treatment are appropriately selected from the usually used methods and conditions. The movable mechanism can be designed depending on the environment of use and objects of application, by adjusting the transformation temperature of the material of the driving member at a desired value by taking advantage of the relation described above and the heat treatment conditions.

The preferable examples of the present invention will be described in more detail based on the drawings, but the invention is not meant to be limited by these.

EXAMPLES

Example 1

FIG. 1(A) is a front view of the movable mechanism (before the start of action) showing an example of the present invention. The driving member 2 is composed of a Ti—Ni alloy wire exhibiting super-elasticity and memorizing a linear shape (having a radius of curvature of a neutral axis x with $R_0=\infty$ and a diameter of t) as shown in (c) in FIG. 1(B). The driving member is curved in a shape (an approximately U-shaped with a radius of curvature R of the neutral axis x) shown in (a) in FIG. 1(B), and one end of the driving member is connected to a fixed body 1 by means of a joint fixture 3a. The other end is connected to a movable body 4 by means of a joint fixture 3b provided on the movable body 4 (FIG. 1(A)). FIG. 1(C) shows enlarged drawings (a), (b) and (c) of the radii of curvature of the neutral axes x corresponding to (a), (b) and (c) in FIG. 1(B).

The driving member 2 is maintained in a U-shape (FIG. 1(B) (a)) by means of driving member guide members 5a and 5b provided at the fixed body 1 and movable member 4 before the start of action (which refers to the state in which the movable body 4 is housed in the fixed body 1), and changes to a memorized linear shape (FIG. 1(B) (c)) during the movable action. The change of the shape of the driving member 2 is suppressed by the driving member guide members 5a and 5b during the action, and stops at a state having a radius of curvature of "$R_p$" (FIG. 1(B) (b)) of the neutral axis. The driving member guide members 5a and 5b are mechanisms by which the driving member 2 is prevented from returning to the linear shape when the both ends of the driving member fixed at the fixed body and movable body are in the most separate position (after the movable action), and by which the driving member is prevented from inversely bending.

This mechanism is necessary because, when the driving member becomes straight in a most extended state of the movable mechanism, the direction for deflecting the driving member by compression becomes unstable, while the initial compression force before deflection may be extremely large, by generating a compression force in an axial direction. Two guide members 5a and 5b for the driving member are not always necessary, because the effect for guiding and stopping the movement of the driving member may be exhibited by the guide member 5a alone or the guide member 5b alone. The guide member itself has been separately proposed by the inventors of the present invention in, for example, JP-A-2003-135417.

The reference numeral 6 denotes a fixing member for fixing the movable body 4 at a position before the movable action, and the reference numeral 7 denotes a movable guide member for guiding the movement of the movable body and for controlling the speed of the movable body.

The joint fixture 3a and 3b may have mechanisms that can rotate in accordance with the movement of the movable body 4.

For ensuring long term reliability of the movable mechanism, it is desirable to determine the memorized shape of the driving member 2 so that the radius of curvature "$R_0$" of the neutral axis when the driving member 2 is in a load free state (FIG. 1(B) (c)) and the radius of curvature "R" of the neutral axis after the movable action (FIG. 1(B) (a)) satisfy the relation of the following formula (I):

$$(t/2R)-(t/2R_0) \leq 4\% \qquad (1)$$

The reason why formula (I) should be satisfied is as follows. The right side of formula (I) represents strain of the driving member before the movable action, and a permanent strain is gradually accumulated by repeated movable actions, when a load causing a strain exceeding 4% is applied on the driving member, to fail in performing a prescribed action. Further, the value at the right side of formula (I) is desirably 2% when the frequency of use of the movable mechanism is extremely large relative to an estimated life cycle of a product.

The "neutral axis" means an axis that neither extends nor shrinks by bending, and corresponds to a central axis of a central face in the direction of thickness in a plate, or at a cross sectional circle in a round columnar rod, in many cases. When the radius of curvature of the neutral axis is not uniform in the sites in the driving member, the neutral axis is defined to be a portion having the largest change of the radius of curvature between the memorized shapes and shapes after the movable action.

Figure 2:
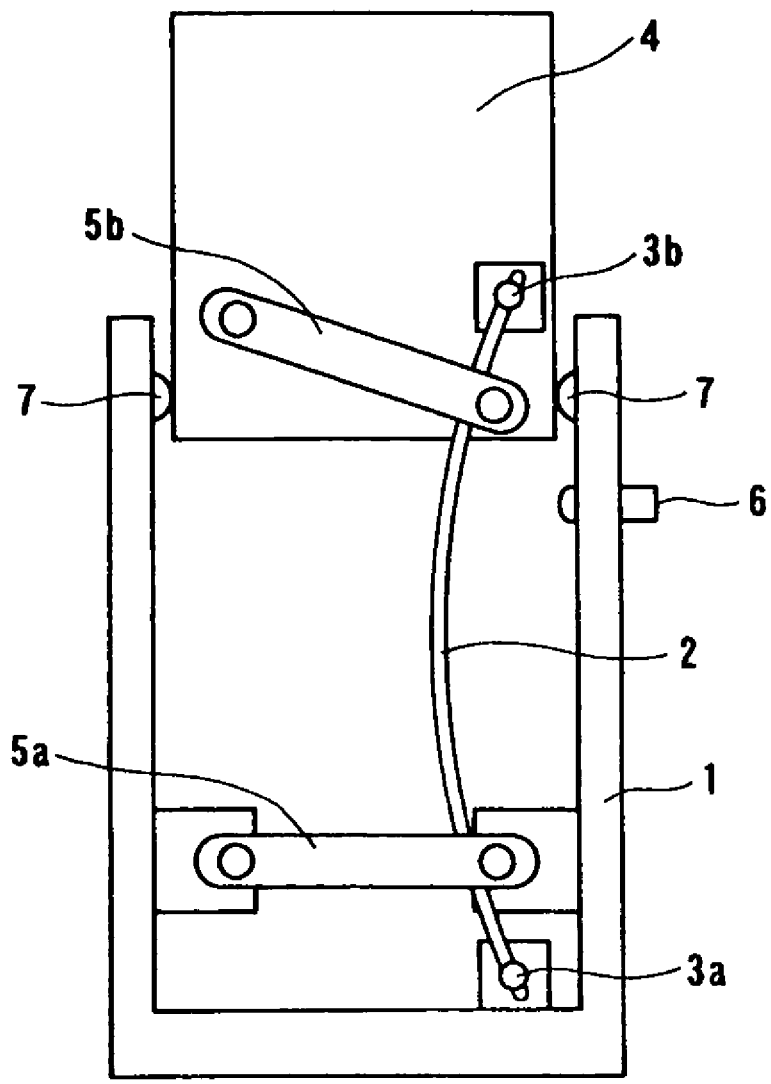
FIG. 2 is a front view showing the driving mechanism according to Example 1 in the invention.

FIG. 2 shows the movable body 4 being popped up after restoring the original shape of the driving member 2. This state is described with reference to FIGS. 1 and 2. The movable body 4 is fixed to the fixed body 1 with the fixing member 6. When fixing with this fixing member is released, the driving member 2 is restored to a memorized shape to move the movable body upward. A moving passageway of the movable body 4 is secured by a sliding movement with the movable body guide member 7 provided on the fixed body 1, and the travel speed of the movable body 4 is controlled by controlling the compression pressure of the movable body guide member 7. Using a plate spring and a bearing is preferable for smooth guidance and speed control by the movable body guide member 7. Any shape of the fixing member may be provided at any position, so long as it is possible to stop ascending of the movable body 4 so as to be arbitrarily releasable.

While the driving member 2 memorizes a linear shape, it cannot completely restore the linear shape due to the driving member guide member 5a and 5b, and becomes curved (FIG. 1(B) (b)). This curved shape guides the direction of deformation of the driving member 2 when the driving member 2 restores the state before the movable action.

For restoring the state before the movable action, the movable body 4 is pushed into the fixing position to fix the movable body 4 with the fixing member 6. The driving member 2 is deformed in accordance with the driving member guide member 5a following a curved shape.

Example 2

FIG. 3(A) is a front view showing the movable mechanism before action. As shown in FIGS. 3(A) and 3(B), the driving member 2 is composed of a Ti—Ni alloy wire exhibiting super-elasticity and memorizing a U-shape (with a radius of curvature of the center axis of $R_0$). Two driving members 2 are used (FIG. 3(A)), and they are approximately symmetrically attached to the movable body. Two driving members 2 are used in order to prevent a pulling, which is liable to occur by using single driving member, from occurring on the movable body when it is ejected from the fixed body. Since the pulling may be generated when an odd number of the driving members are used or when the driving members are extremely asymmetrically disposed in the apparatus, it is desirable to use an even number of the driving members 2 and attach them to be as symmetrical as possible relative to the movable body.

Figure 3:
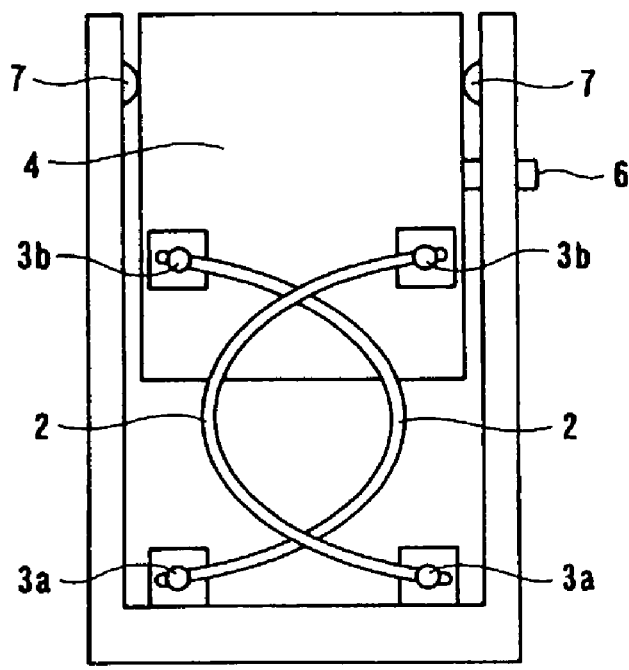
FIG. 3(A) is a front view showing the movable mechanism according to Example 2 in the present invention.
FIG. 3(B) is an explanatory view showing the action of the driving member used in this example.
Figure 3:
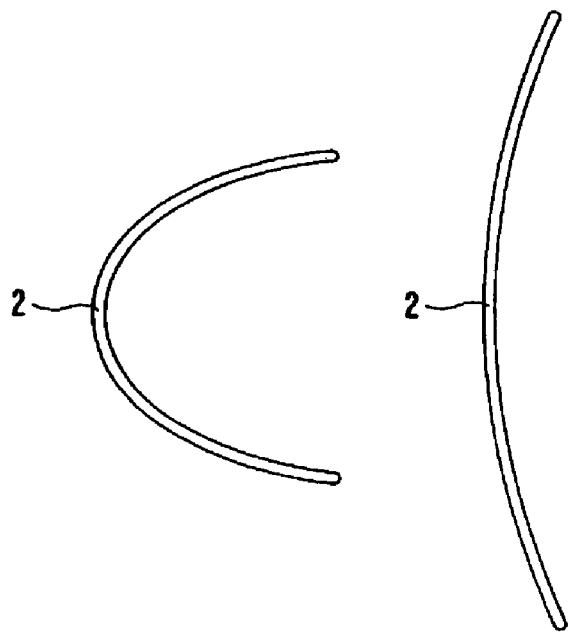

As shown in FIG. 3, the driving member 2 has R, which denotes the radius of curvature of the neutral axis before the movable action (FIG. 3(B) (a)), and $R_0$ denotes the radius of curvature of the neutral axis after the movable action (FIG. 3(B) (b)), and R ($R<R_0$) is a U-shape and is bent in the same direction as the memorized direction (FIG. 3(B) (b)).

Since the mechanism for preventing the driving member from returning to the linear shape (the driving member guide member) as used in Example 1 is not needed in this example by setting the curved shape in advance in the direction for bending the driving member, the mechanism may be more simple.

For designing the shape of the driving member in this example, it is desirable to use the relation defined by formula (I) described in Example 1.

Example 3

Figure 4:
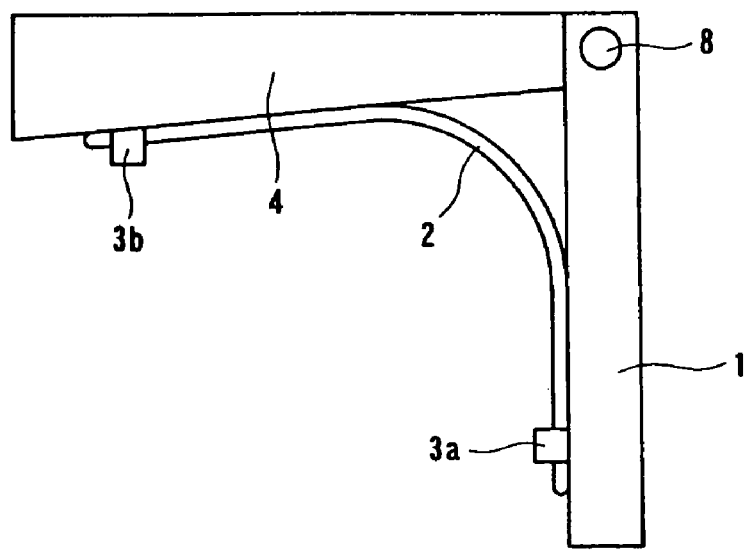
FIG. 4(A) is a front view showing the movable mechanism according to Example 3 in the present invention.
FIG. 4(B) is an explanatory view showing the action of the driving member used in this example.
Figure 4:
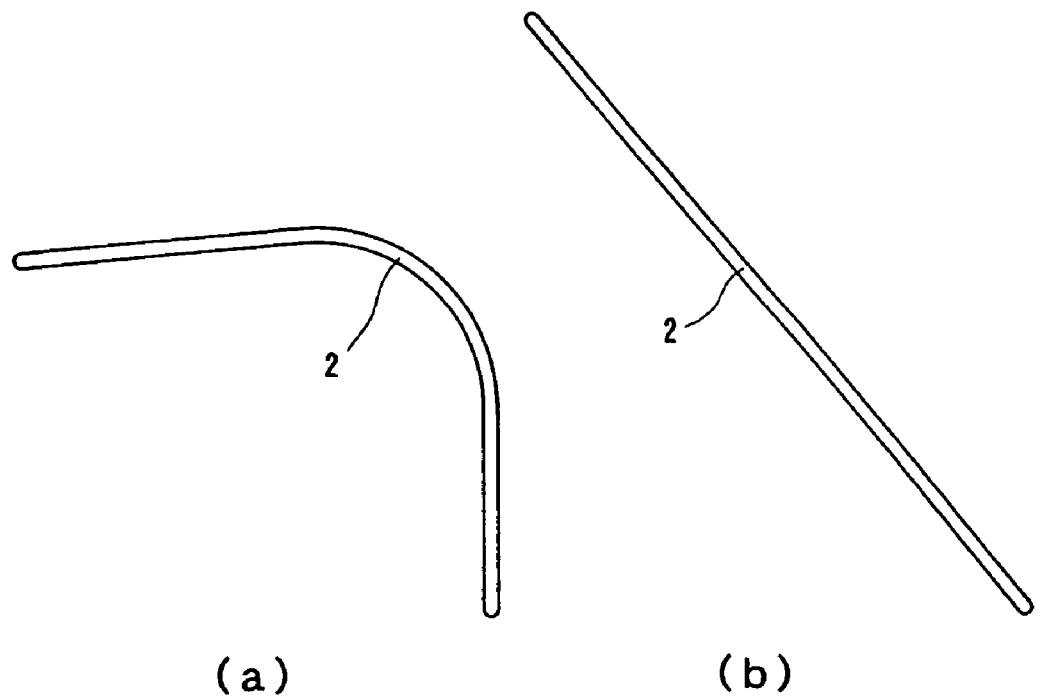

FIG. 4(A) shows an example of the movable mechanism capable of pop-up movement by rotating a movable body 4. A linear or thin plate driving member 2 is fixed to a fixed body 1 and movable body 4, which are joined so as to be able to rotate about a rotation axis 8, with joint fixtures 3a and 3b, respectively.

In the movable mechanism shown in FIG. 4(A), the movable body 4 is initially fixed with a fixing member (not shown). When the fixing member is released, the shape of the driving member 2 changes to a memorized straight shape by taking advantage of a shape restoring property of the driving member to pop-up the movable body 4. The movable mechanism shown in FIG. 4(A) may appropriately comprise the same members as described in Examples 1 and 2, for example the movable body guide member 7 and driving member guide members 5a and 5b, although these members are not illustrated in the drawing.

The shapes of the driving member 2 before the driving action and after the driving action (or memorized shape) are shown in (a) and (b), respectively, in FIG. 4(B).

The memorized shape may be U-shape, instead of a linear shape. In this case, the popped movable mechanism is not only linear, but is with an angle.

It is also desirable to use the relation of formula (I) described in Example 1 for designing the shape of the driving member in this example.

Example 4

Figure 5:
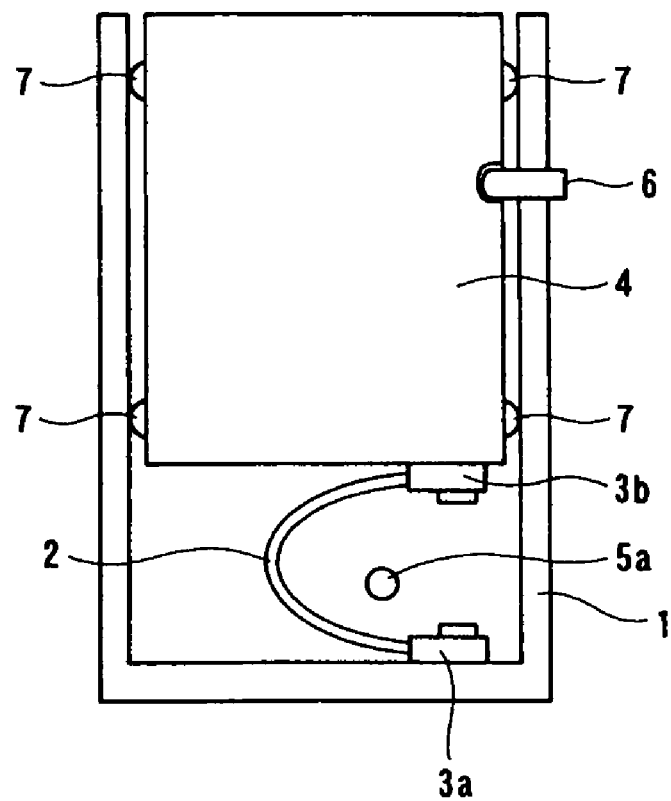
FIG. 5 is a front view showing the movable mechanism according to Example 4 in the present invention.
Figure 5:
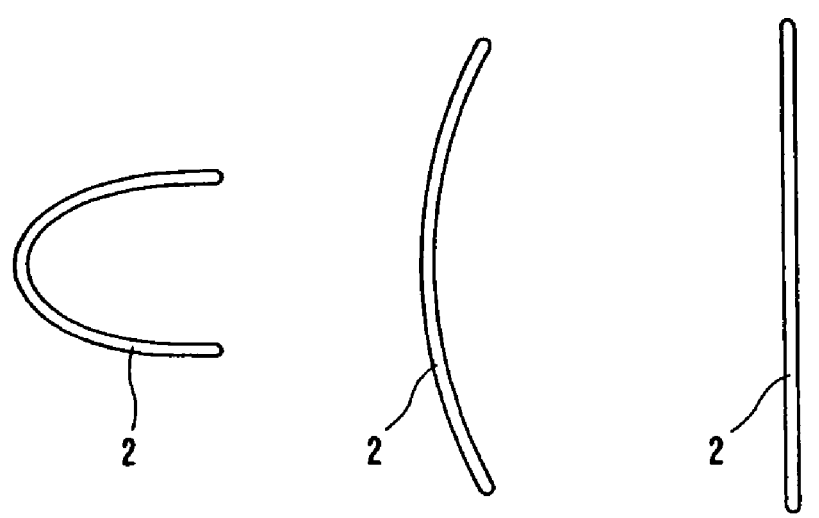

FIGS. 5(A) and 5(B) show modifications of Example 1. The driving member 2 is composed of a thin plate of a super-elastic Ti—Ni alloy memorizing a linear shape of the cross section (with a radius of curvature $R_0$ of the neutral axis). In FIG. 5(A), joint fixtures 3a and 3b for connecting the driving member 2 are provided at the fixed body 1 and the bottoms of movable body 4, respectively. The driving member guide member 5a is provided between the fixed body 1 and movable body 4 in order to guide the driving member 2 to a position and to define a deformation limiting position during the movable action. The fixing member 6 is provided on the fixed body 1 in order to fix the movable body 4 in a state before the movable action. Movable body guide members 7 and 7 are provided on the movable body 4 in order to permit the movable body to smoothly move and to control the travel speed of the movable body.

The driving member 2 of this example is shown in FIG. 5(B). The shapes of the driving member before and after the movable action are shown in (a) and (b) of FIG. 5(B), respectively, and the memorized shape is shown in (c) in FIG. 5(B). It is also desirable to use the relation of formula (I) described in Example 1 for designing the shape of the driving member in this example.

INDUSTRIAL APPLICABILITY

The pop-up mechanism obtained according to the present invention only requires the diameter of wire material or the thickness of guide, and is able to pop-up an apparatus within a smaller area (small occupation area) than the area required for an apparatus using a motor drive mechanism or coil spring, to enable the mechanism to be simple. The pop-up mechanism is also able to obtain a large action force and movable range.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A movable mechanism comprising:
   a fixed body;
   a movable body;
   a driving member, one end of which is attached to the fixed body and the other end of which is attached to the movable body, for changing the position of the movable body, in which the driving member is composed of a Ni—Ti-based alloy which is a super-elastic body and has shape restorability, and in which the driving member memorizes a linear shape as the original shape;
   a movable body guide member, which is provided on the fixed body, for guiding movement of the movable body, to cause a sliding movement of the movable body with the movable body guide member, to lower a speed of the movable body when the movable body moves; and
   a driving member guide member for guiding deformation of the driving member, to set a deformation limit position of the driving member, such that the driving member would not completely restore the linear shape but would have a given curvature, when the movable body moves,
   wherein the movable body is moved by the shape restorability of the driving member that has been released from being fixed.

2. The movable mechanism according to claim 1, wherein the driving member has strain "e" as determined by $e=(t/2R)-(t/2R_0)$ is 4% or less, in which "$R_0$" is a radius of curvature of a neutral axis of the driving member at a load-free state, "R" is a radius of curvature of the neutral axis formed when both ends of the driving member are closest to one another, and "t" is the thickness or diameter of the driving member.

3. The movable mechanism according to claim 1, wherein the driving member is subjected to a shape memory treatment in advance for allowing the driving member to curve in the direction for bending the driving member, when the movable body moves relative to the fixed body.

4. The movable mechanism according to claim 1, wherein the driving member is subjected to a linear shape memory treatment, and comprises a mechanism for preventing the driving member from returning to linear shape even when the both ends of the driving member respectively fixed to the fixed body or the movable body are in the most separate position.

5. The movable mechanism according to claim 1, wherein the composition of the Ni—Ti-based alloy comprises 50.2 to 51.5 at % of Ni, with the balance being Ti and inevitable impurities.

6. The movable mechanism according to claim 1, wherein the composition of the Ni—Ti-based alloy comprises 49.8 to 51.5 at % of Ni, and 0.1 to 2.0 at % of at least one selected from the group consisting of Cr, Fe, V, Al, Cu, Co and Mo, with the balance being Ti and inevitable impurities.

7. The movable mechanism according to claim 1, wherein the composition of the Ni—Ti-based alloy comprises 49.0 to 51.0 at % of Ni, 5 to 12 at % of Cu, and 0.1 to 2.0 at % of at least one selected from the group consisting of Cr, Fe, V, Al, Co and Mo, with the balance being Ti and inevitable impurities.

8. The movable mechanism according to claim 1, wherein at least two driving members are provided in the movable mechanism.

9. The movable mechanism according to claim 1, wherein the movable body guide member for guiding movement of the movable body further controls the speed of the movable body when the movable body moves.

10. A movable mechanism comprising:
    a fixed body;
    a movable body;
    a movable body guide member for guiding movement of the movable body;
    a driving member, one end of which is attached to the fixed body and the other end of which is attached to the movable body, for changing the position of the movable body; and
    a driving member guide member for guiding amount of deformation of the driving member to set a deformation limit position of the driving member, when the movable body moves,
    wherein the movable body is moved by shape restorability of the driving member that has been released from being fixed.

11. The movable mechanism according to claim 1, wherein the movable body, when fixed, is configured at least partially within the fixed body.

12. The movable mechanism according to claim 1, wherein the movable body is guided to move laterally with respect to the fixed body by the movable body guide member.

13. The movable mechanism according to claim 1, wherein the movable body is guided to move rotationally with respect to the fixed body by the movable body guide member.

14. A movable mechanism comprising:
    a fixed body;
    a movable body;

a driving member, one end of which is attached to the fixed body and the other end of which is attached to the movable body, for changing the position of the movable body; and a movable body guide member for guiding movement of the movable body to control the speed of the movable body when the movable body moves, wherein the movable body is moved by shape restorability of the driving member that has been released from being fixed.

15. A movable mechanism comprising:

a fixed body;

a movable body;

a driving member, one end of which is attached to the fixed body and the other end of which is attached to the movable body, for changing the position of the movable body; and a driving member guide member for guiding amount of deformation of the driving member to set a deformation limit position of the driving member, when the movable body moves, wherein the movable body is moved by shape restorability of the driving member that has been released from being fixed.

16. The movable mechanism according to claim 10, wherein the driving member is a super-elastic body, and the driving member has strain "e" as determined by $e=(t/2R)-(t/2R_0)$ is 4% or less, in which "$R_0$" is a radius of curvature of a neutral axis of the driving member at a load-free state, "R" is a radius of curvature of the neutral axis formed when both ends of the driving member are closest to one another, and "t" is the thickness or diameter of the driving member.

17. The movable mechanism according to claim 10, wherein the driving member is subjected to a shape memory treatment in advance for allowing the driving member to curve in the direction for bending the driving member, when the movable body moves relative to the fixed body.

18. The movable mechanism according to claim 10, wherein the driving member is subjected to a linear shape memory treatment, and comprises a mechanism for preventing the driving member from returning to linear shape even when the both ends of the driving member respectively fixed to the fixed body or the movable body are in the most separate position.

19. The movable mechanism according to claim 10, wherein the driving member is composed of a Ni—Ti alloy which is a super-elastic body, and the composition of the alloy comprises 50.2 to 51.5 at % of Ni, with the balance being Ti and inevitable impurities.

20. The movable mechanism according to claim 14, wherein the driving member is a super-elastic body, and the driving member has strain "e" as determined by $e=(t/2R)-(t/2R_0)$ is 4% or less, in which "$R_0$" is a radius of curvature of a neutral axis of the driving member at a load-free state, "R" is a radius of curvature of the neutral axis formed when both ends of the driving member are closest to one another, and "t" is the thickness or diameter of the driving member.

21. The movable mechanism according to claim 14, wherein the driving member is subjected to a shape memory treatment in advance for allowing the driving member to curve in the direction for bending the driving member, when the movable body moves relative to the fixed body.

22. The movable mechanism according to claim 14, wherein the driving member is subjected to a linear shape memory treatment, and comprises a mechanism for preventing the driving member from returning to linear shape even when the both ends of the driving member respectively fixed to the fixed body or the movable body are in the most separate position.

23. The movable mechanism according to claim 14, wherein the driving member is composed of a Ni—Ti alloy which is a super-elastic body, and the composition of the alloy comprises 50.2 to 51.5 at % of Ni, with the balance being Ti and inevitable impurities.

24. The movable mechanism according to claim 15, wherein the driving member is a super-elastic body, and the driving member has strain "e" as determined by $e=(t/2R)-(t/2R_0)$ is 4% or less, in which "$R_0$" is a radius of curvature of a neutral axis of the driving member at a load-free state, "R" is a radius of curvature of the neutral axis formed when both ends of the driving member are closest to one another, and "t" is the thickness or diameter of the driving member.

25. The movable mechanism according to claim 15, wherein the driving member is subjected to a shape memory treatment in advance for allowing the driving member to curve in the direction for bending the driving member, when the movable body moves relative to the fixed body.

26. The movable mechanism according to claim 15, wherein the driving member is subjected to a linear shape memory treatment, and comprises a mechanism for preventing the driving member from returning to linear shape even when the both ends of the driving member respectively fixed to the fixed body or the movable body are in the most separate position.

27. The movable mechanism according to claim 15, wherein the driving member is composed of a Ni—Ti alloy which is a super-elastic body, and the composition of the alloy comprises 50.2 to 51.5 at % of Ni, with the balance being Ti and inevitable impurities.

* * * * *